United States Patent
Ward (10) Patent No.: US 7,365,959 B1
(45) Date of Patent: Apr. 29, 2008

(54) MULTI VALUE CAPACITOR

(76) Inventor: Charles Barry Ward, 3615 Goldenrod Dr., Alpharetta, GA (US) 30005

( * ) Notice: Subject to any disclaimer, the term of this patent is extended or adjusted under 35 U.S.C. 154(b) by 428 days.

(21) Appl. No.: 11/202,607

(22) Filed: Aug. 12, 2005

Related U.S. Application Data (60) Provisional application No. 60/667,791, filed on Apr. 1, 2005, provisional application No. 60/601,048, filed on Aug. 12, 2004.

(51) Int. Cl.
*H01G 4/38* (2006.01)

(52) U.S. Cl. ............... 361/328; 361/301.1; 361/301.5; 361/502; 361/503; 361/512; 361/523

(58) Field of Classification Search .............. 361/328, 361/330, 301.1, 301.3, 301.5, 502–504, 508–512, 361/516–519, 523–528
See application file for complete search history.

(56) References Cited

U.S. PATENT DOCUMENTS

| | | | |
|---|---|---|---|
| 2,128,857 A | 8/1938 | Stacy | |
| 2,264,994 A | 12/1941 | Marbury et al. | |
| 3,522,498 A | 8/1970 | Price | |
| 3,754,152 A | 8/1973 | Koehler et al. | |
| 3,838,316 A | 9/1974 | Brown et al. | |
| 3,921,041 A | 11/1975 | Stockman | |
| 4,028,595 A | 6/1977 | Stockman | |
| 4,263,638 A | 4/1981 | Stockman et al. | |
| 4,312,027 A | 1/1982 | Stockman | |
| 4,326,237 A | 4/1982 | Markarian et al. | |
| 4,342,143 A | 8/1982 | Jennings | |
| 4,352,145 A | 9/1982 | Stockman | |
| 4,398,782 A | 8/1983 | Markarian | |
| 4,408,818 A | 10/1983 | Markarian | |
| 4,447,854 A | 5/1984 | Markarian | |
| 4,467,397 A | 8/1984 | Thiel et al. | |
| 4,558,394 A | 12/1985 | Stockman | |
| 4,616,290 A | 10/1986 | Watanabe et al. | |
| 4,677,523 A | 6/1987 | Kauppi | |
| 4,803,598 A | 2/1989 | Efford et al. | |
| 4,856,102 A | 8/1989 | Insetta et al. | |
| 5,001,597 A | 3/1991 | Stockman | |

(Continued)

FOREIGN PATENT DOCUMENTS

GB 2 091 038 A 7/1982

(Continued)

*Primary Examiner*—Nguyen T. Ha
(74) *Attorney, Agent, or Firm*—Smith Gambrell & Russell LLP (57) ABSTRACT

A multi value capacitor is constructed in a single can having a core with three capacitor elements. The capacitor elements are chosen to provide a selectable range of discrete capacitance values when connected in various combinations. The capacitor elements are each connected to a common terminal. The first capacitor element is connected to a first cam contact, the second capacitor element is connected to a second cam contact, and the third capacitor element is connected to a third cam contact. A dial switch mechanism is mounted to the can and connected to a switched terminal, and includes a dial shaft and a rotating contact connected thereto. Rotating the dial switch mechanism will cause the rotating contact, which has three wiper contacts, to engage raised portions of the various cam contacts in various combinations to create various capacitance values between the switched terminal and the common terminal.

20 Claims, 15 Drawing Sheets

U.S. PATENT DOCUMENTS

| | | |
|---|---|---|
| 5,006,726 A | 4/1991 | Okumura |
| 5,019,934 A * | 5/1991 | Bentley et al. .............. 361/15 |
| 5,075,815 A | 12/1991 | Price |
| 5,138,519 A | 8/1992 | Stockman |
| 5,313,360 A | 5/1994 | Stockman |
| 5,548,473 A | 8/1996 | Wang |
| 5,940,263 A | 8/1999 | Jakoubovitch |
| 6,014,308 A | 1/2000 | Stockman |
| 6,147,856 A | 11/2000 | Karidis |
| 6,201,686 B1 * | 3/2001 | Hiratsuka et al. .......... 361/502 |
| 6,212,058 B1 * | 4/2001 | Huber .................... 361/301.5 |
| 6,249,422 B1 | 6/2001 | Tsai |
| 6,313,978 B1 | 11/2001 | Stockman et al. |
| 6,490,158 B1 * | 12/2002 | Ellyson et al. ............. 361/690 |
| 6,529,364 B1 | 3/2003 | Tsai |
| 6,593,672 B2 | 7/2003 | Ma et al. |
| 6,630,637 B1 * | 10/2003 | Ward et al. ............... 200/17 R |
| 6,711,000 B2 * | 3/2004 | Takeishi et al. ............ 361/523 |
| 7,046,498 B1 * | 5/2006 | Huang .................... 361/301.2 |
| 7,203,053 B2 * | 4/2007 | Stockman ................ 361/301.5 |
| 2002/0089813 A1 | 7/2002 | Yamamoto et al. |

FOREIGN PATENT DOCUMENTS

| | | |
|---|---|---|
| JP | 6-29149 | 6/1994 |

* cited by examiner

MULTI VALUE CAPACITOR

CLAIM OF PRIORITY

This application claims priority from U.S. Provisional Patent Application Ser. No. 60/667,791 filed on Apr. 1, 2005, and U.S. Provisional Patent Application Ser. No. 60/601,048 filed on Aug. 12, 2004, both of which are incorporated herein in their entirety.

FIELD OF THE INVENTION

This invention relates to a multi value capacitor for an electric motor. More particularly, the invention relates to a multi value capacitor that can be configured by a repair technician in the field to have one of a number of capacitance values to accommodate the circumstance required to maintain or repair a particular electric motor being serviced.

BACKGROUND OF THE INVENTION

A distributor for electric motors currently carries several motor run capacitors of different values that must be stocked to fill the service chain. Service technicians and distributors must stock capacitors of different values even though only a few values are high volume.

A motor run capacitor consists of several parts: a steel or aluminum can with insulator/connections on the top and with a capacitor element inside. Oil or paraffin filling acts as a moisture barrier and an electrical insulator for the capacitor element. The capacitor element consisting of two foil layers separated by an insulator (paper, Mylar, or other very thin insulating material). The foil(s) and insulating material are made in the form of a long sandwich 2 or 3 inches high and several 10's of feet long. The sandwich is rolled to form a cylindrical shaped capacitor element that has electrical connections to each of the 2 foils. The rolled capacitor element is typically 1 inch in diameter and 2 or 3 inches long. The rolled capacitor element is placed into the can and connected through two terminals on the outside of the can.

Dual capacitors are made with a similar construction, but one of the foil layers is separated to form two capacitor elements. An additional lead wire is connected to the third foil. A dual capacitor with asymmetrical capacitance values can be configured to create a three value capacitor by connecting the first element, the second element, or both elements in parallel.

Because a good portion of the cost of a motor run capacitor is in the case, winding the element, packaging, and general handling, a single capacitor that can be configured to provide different values offers cost advantages over stocking multiple capacitors of different values.

SUMMARY OF THE INVENTION

The multi value motor capacitor of the present invention is constructed in a single can having a core with three capacitor elements. The capacitor elements are designed to provide capacitance values that, when connected in various combinations, provide all of the popular capacitance values. Therefore one SKU part number will cover the majority of motor capacitor applications.

For example, the capacitance values for the capacitor elements for the multi value capacitor of the present invention could be 2.5 µF, 5.0 µF, and 10.0 µF. The multi value capacitor would cost less than the sum of the individual capacitors due to the common components.

The following table shows the seven capacitance values that can be derived from the multi value capacitor having capacitor elements of 2.5 µF, 5.0 µF, and 10.0 µF.

TABLE 1

| Equivalent Capacitor | Core values | | |
|---|---|---|---|
| | 2.5 | 5 | 10 |
| 2.5 | X | | |
| 5 | | X | |
| 7.5 | X | X | |
| 10 | | | X |
| 12.5 | X | | X |
| 15 | | X | X |
| 17.5 | X | X | X |

As demonstrated above the multi value capacitor replicates seven popular values while being only slightly larger than a standard dual 5/10 capacitor. The capacitor has a simple two terminal hook up and looks similar to existing round or oval capacitors.

In one embodiment of the invention, the field programming is accomplished by a dial switch mechanism, which when turned provides contact connections between and among the various capacitor elements in accordance with the values in Table 1 above. The dial switch mechanism includes a rotating contact that engages multiple cam contacts to connect the capacitor elements in different combinations to create multiple capacitance values. In another embodiment of the present invention, inserting or removing screws at the top of the capacitor accomplishes field programming. The screws interconnect the capacitor elements in accordance with the values in Table 1 above.

DETAILED DESCRIPTION OF THE PREFERRED EMBODIMENT

Figure 1:
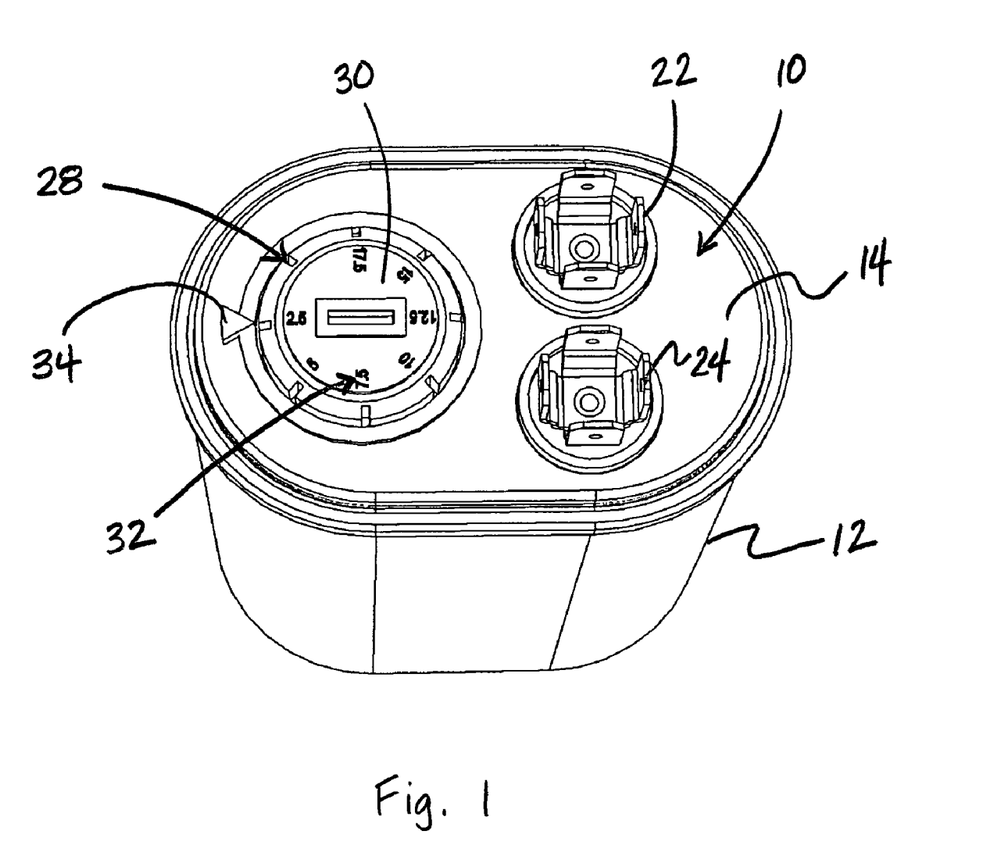
FIG. 1 is a perspective view of the multi value capacitor in accordance with the present invention.

Turning to FIG. 1, the multi value capacitor 10 of the present invention comprises a can 12 with a top cover 14. A common terminal 22 and a switched terminal 24 are mounted on the top cover 14 of the can 12. A dial switch mechanism 28 is also mounted on top cover 14 of the can 12. The dial switch mechanism 28 includes a pointer 34 mounted on the top cover 14 and a dial cover 30 with indices 32 printed thereon. The pointer 34 and the indices 32 indicate the value of the capacitance selected by rotating the dial switch mechanism 28.

Figure 2:
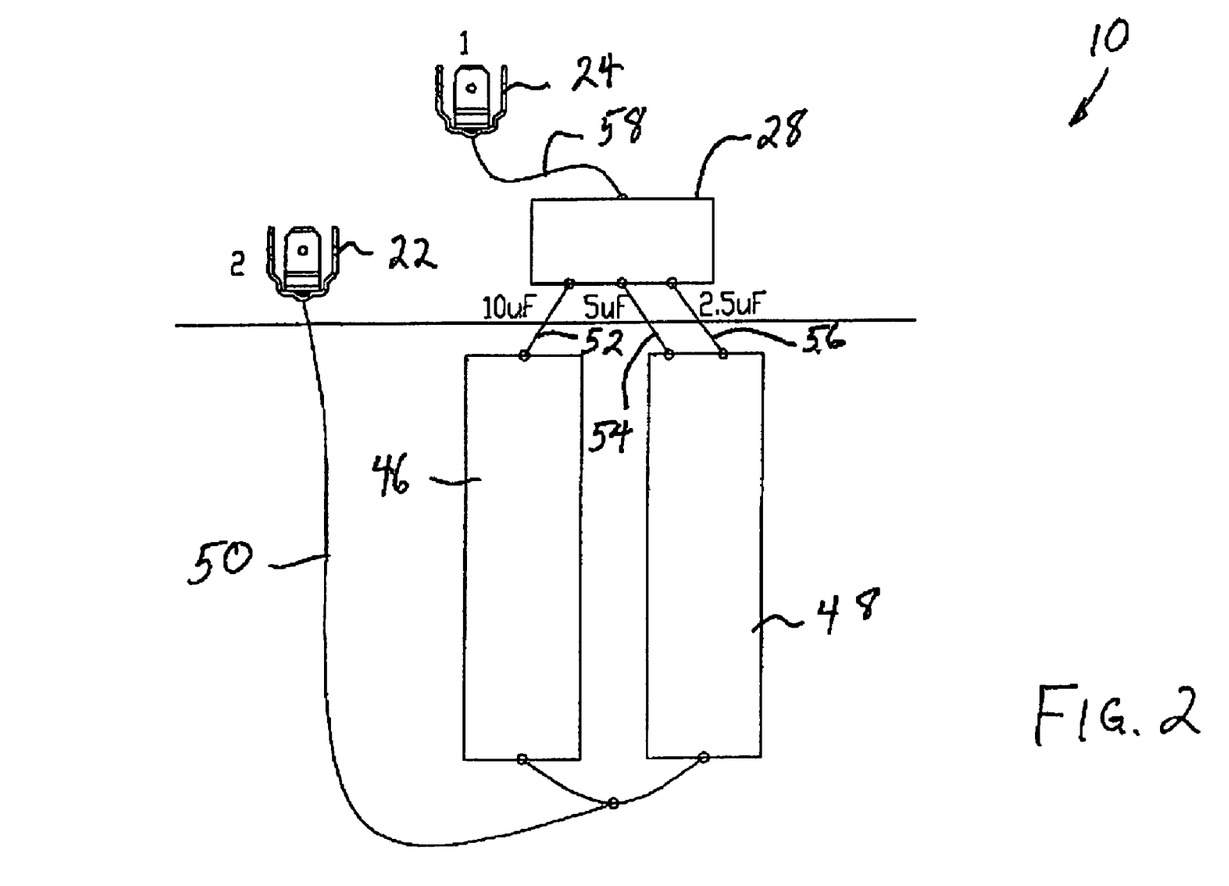
FIG. 2 is a schematic diagram of the multi value capacitor in accordance with present invention.

FIG. 2 shows schematically the construction of the multi value capacitor 10. The multi value capacitor 10 includes a 10.0 μF capacitor element 46 and a dual 2.5 μF and 5.0 μF capacitor element 48 (although three separate capacitor elements could be employed). The capacitor elements 46 and 48 are connected to the common terminal 22, by means of a common lead wire 50. The 10.0 μF element 46 is connected to the dial switch mechanism 28 by 10.0 μF lead wire 52. The separate sections of the of 2.5 μF and 5.0 μF element 48 are connected to the of dial switch mechanism 28 by means of a 5.0 μg lead wire 54 and a 2.5 μF lead wire 56. The dial switch mechanism 28 is connected to the switched terminal 24 by means of a switched lead wire 58.

In order to provide multiple values of capacitance at the terminals 22 and 24, the dial switch mechanism 28 connects the capacitor elements 46 and 48 in the combinations shown in Table 1 above to provide the seven values of capacitance.

Figure 6:
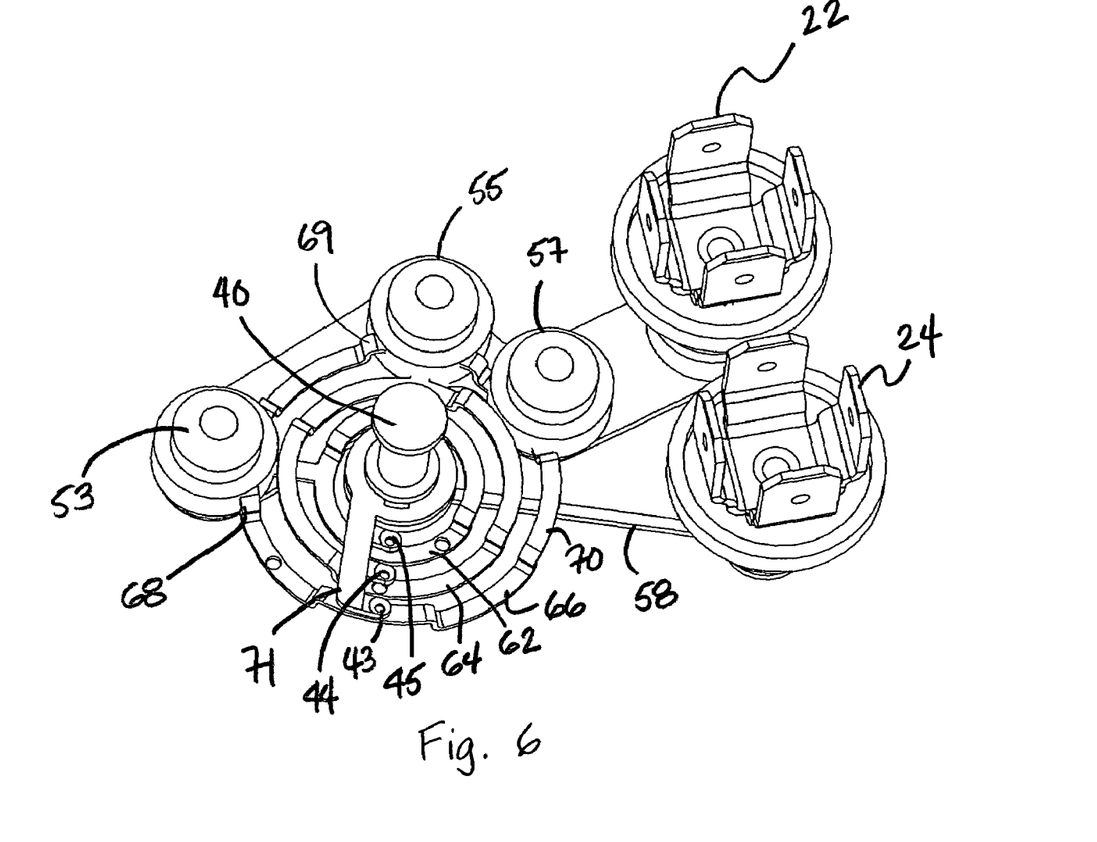
FIG. 6 is a detailed top perspective view of the dial switch mechanism of the multi value capacitor in accordance with the present invention.
Figure 7:
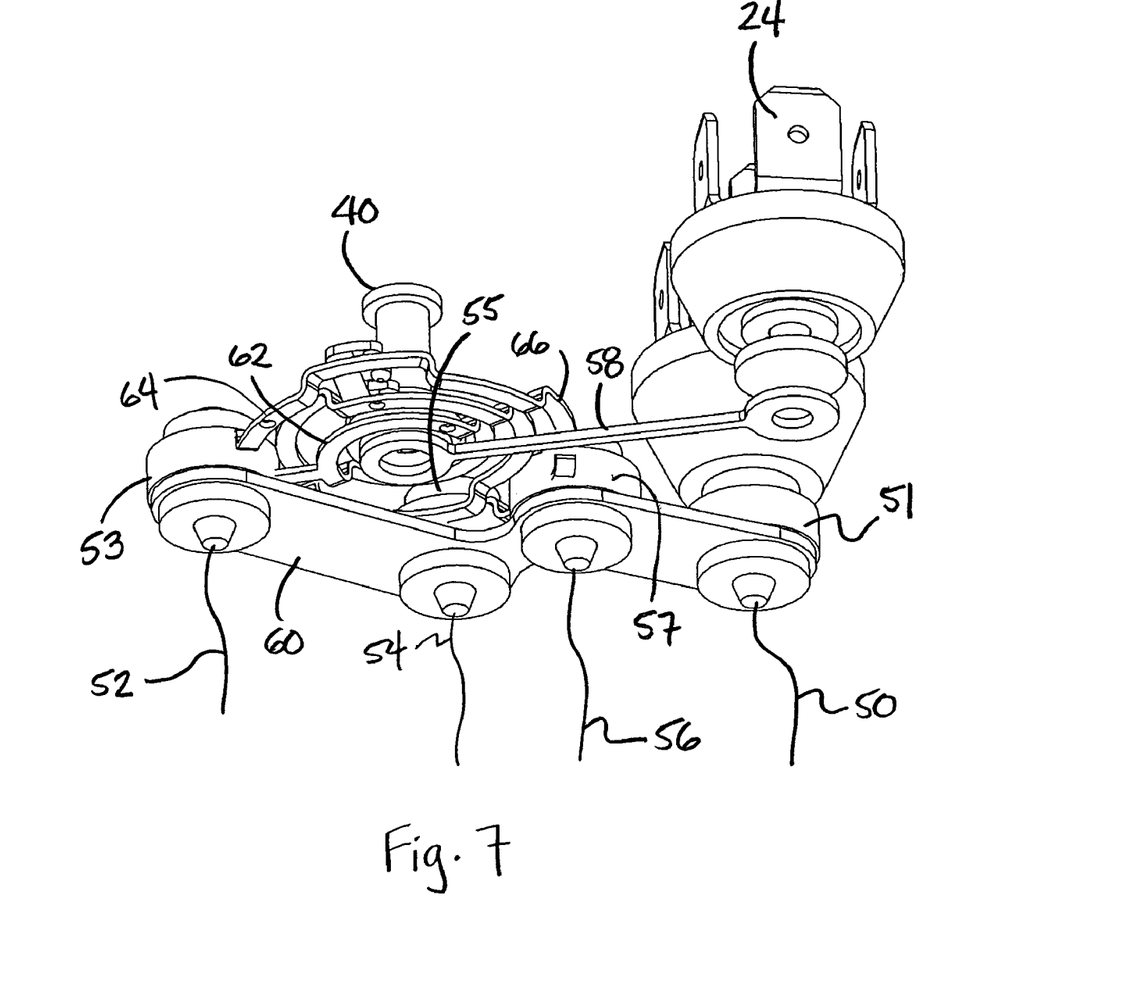
FIG. 7 is a detailed bottom perspective view of the dial switch mechanism of the multi value capacitor in accordance with the present invention.
Figure 8A:
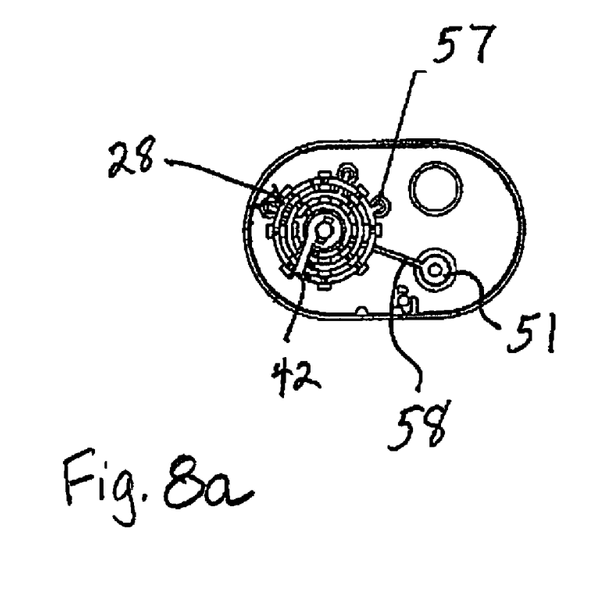
FIGS. 8a and 8b are detailed drawings of the dial switch mechanism of the multi value capacitor in accordance with the present invention.
Figure 8B:
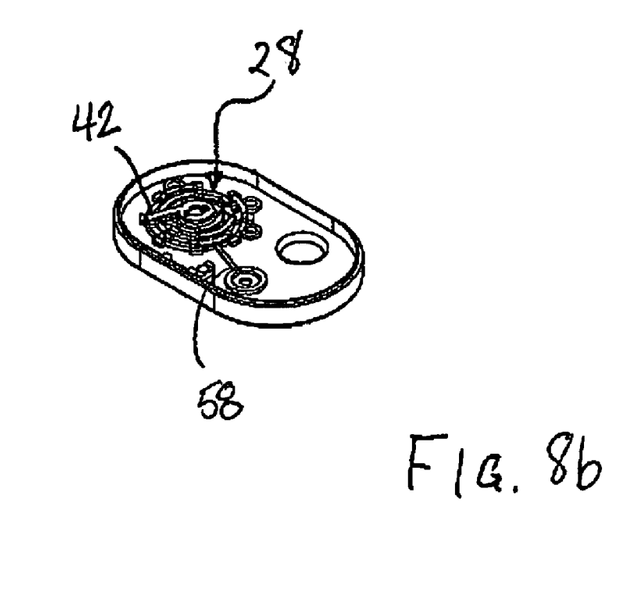
Figure 9A:
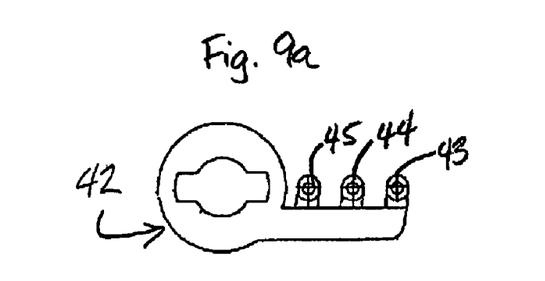
FIGS. 9a-9g are detailed drawings of the rotating contact of the dial switch mechanism of the multi value capacitor in accordance with the present invention.
Figure 9B:
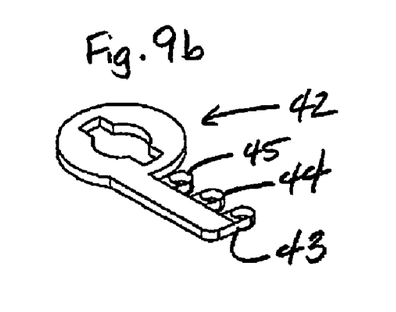
Figures 9C, 9D, 9F:
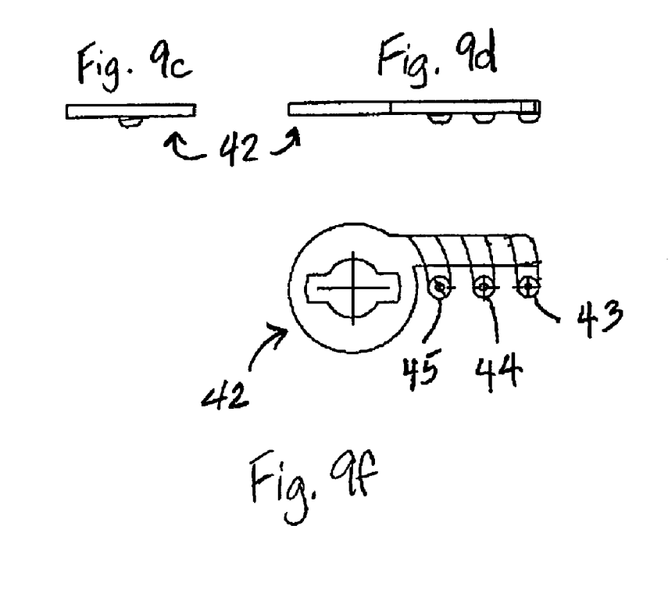
Figures 9E, 9G:
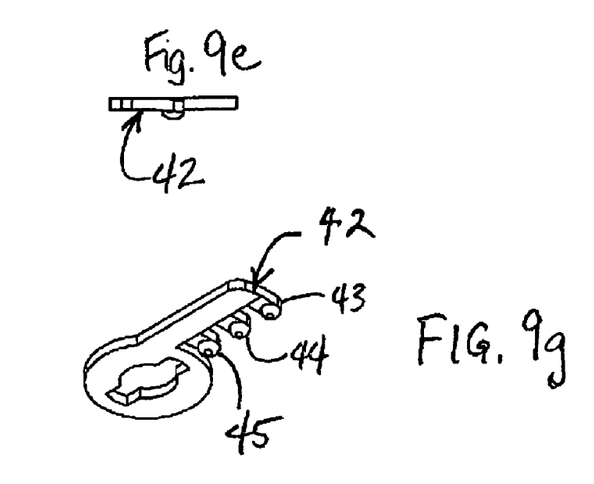
Figure 10A:
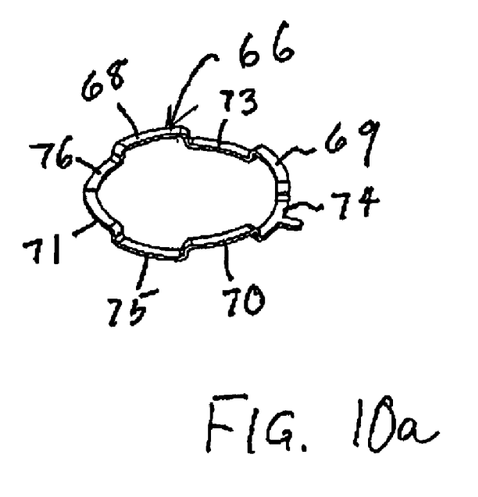
FIGS. 10a-10e are detailed drawings of the 2.5 µF cam contact of the dial switch mechanism of the multi value capacitor in accordance with the present invention.
Figure 10B:
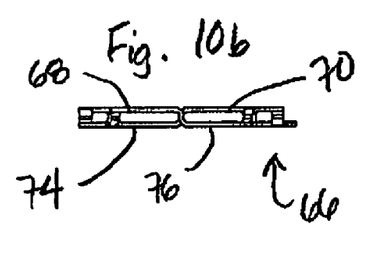
Figure 10C:
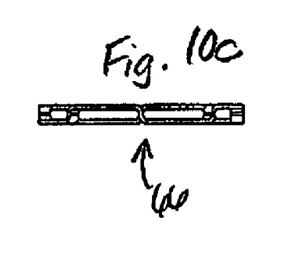
Figure 10D:
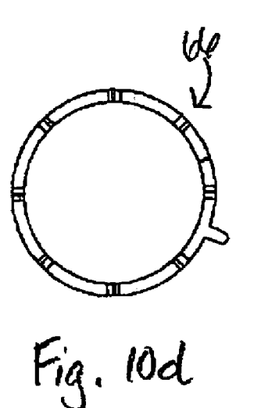
Figure 10E:
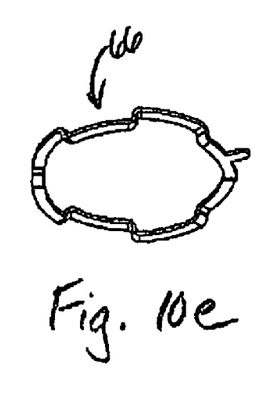
Figure 11A:
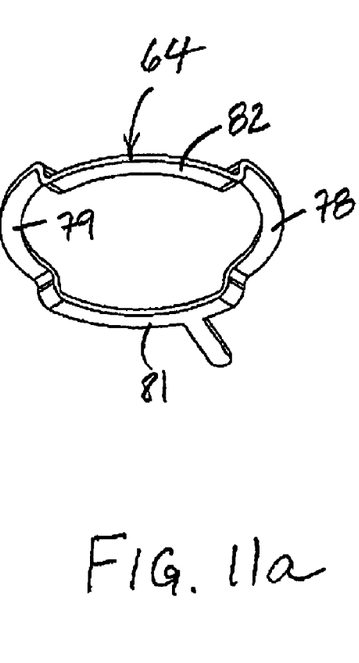
FIGS. 11a-11e are detailed drawings of the 5.0 µF cam contact of the dial switch mechanism of the multi value capacitor in accordance with the present invention.
Figure 11B:
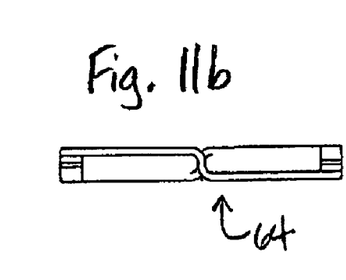
Figure 11C:
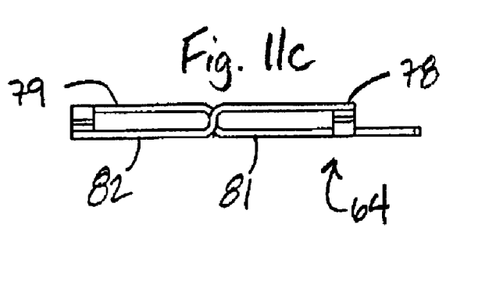
Figure 11D:
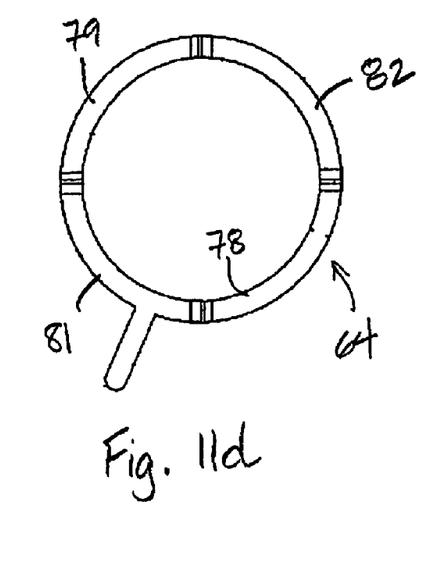
Figure 11E:
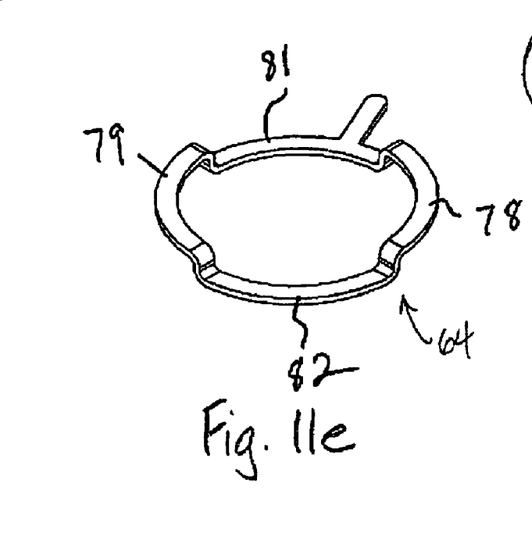
Figure 12A:
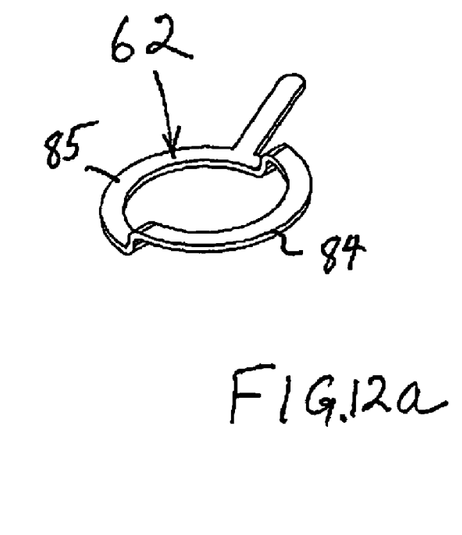
FIGS. 12a-12e are detailed drawings of the 10.0 μF cam contact of the dial switch mechanism of the multi value capacitor in accordance with the present invention.
Figures 12B, 12D:
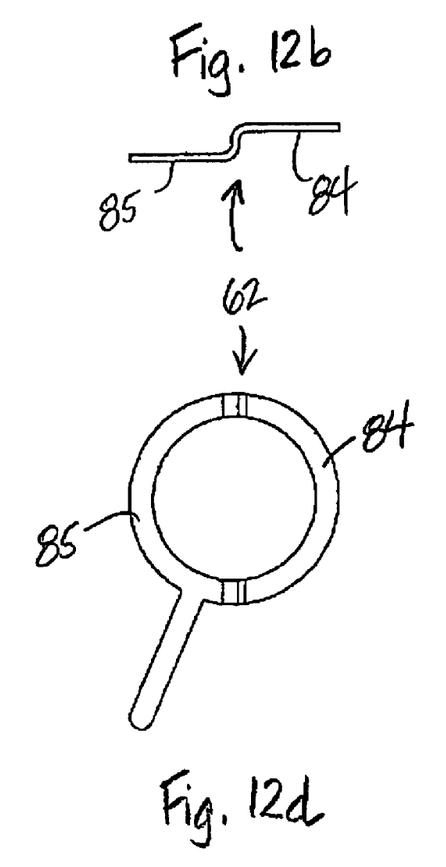
Figure 12C:
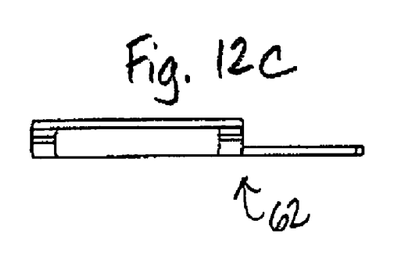
Figure 12E:
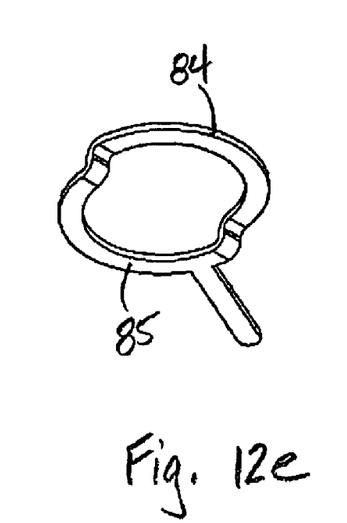
Figure 13A:
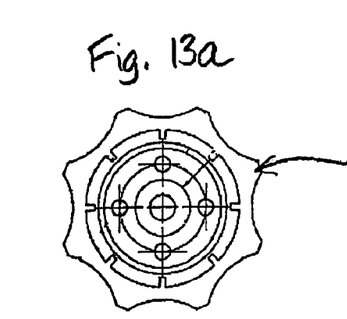
FIGS. 13a-13e are detailed drawings of the dial detent of the dial switch mechanism of the multi value capacitor in accordance with the present invention.
Figure 13B:
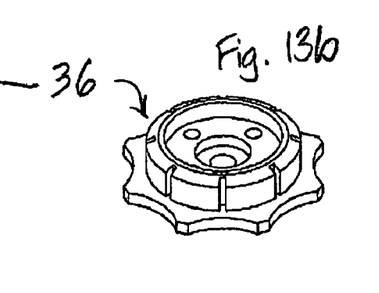
Figure 13C:
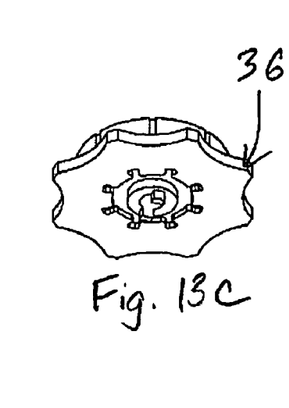
Figures 13D, 13E:
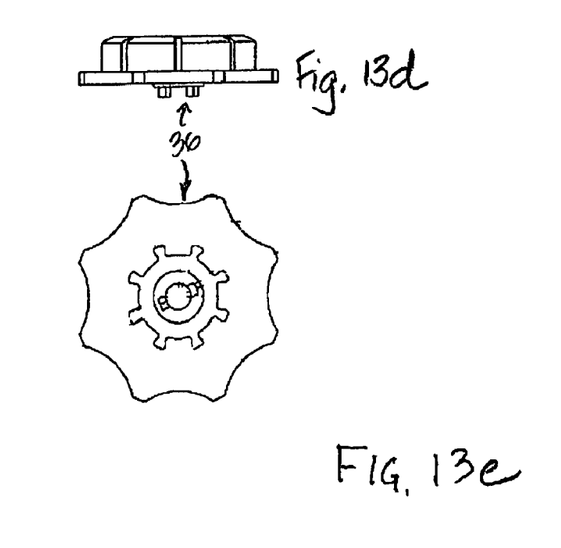
Figures 14A, 14C:
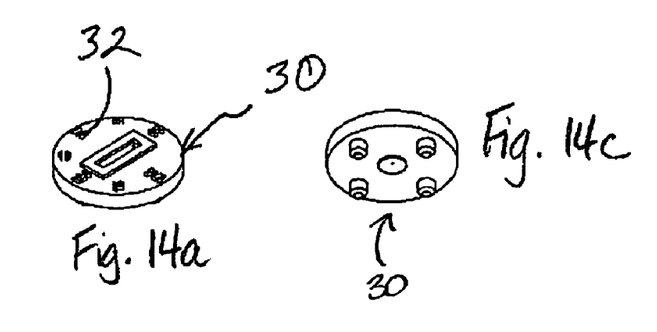
FIGS. 14a-14f are detailed drawings of the dial cover of the dial switch mechanism of the multi value capacitor in accordance with the present invention.
Figure 14B:
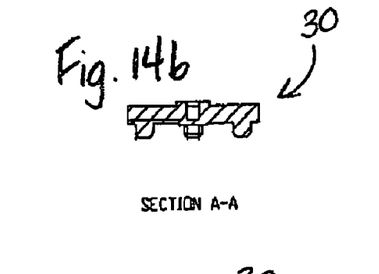
Figures 14D, 14E:
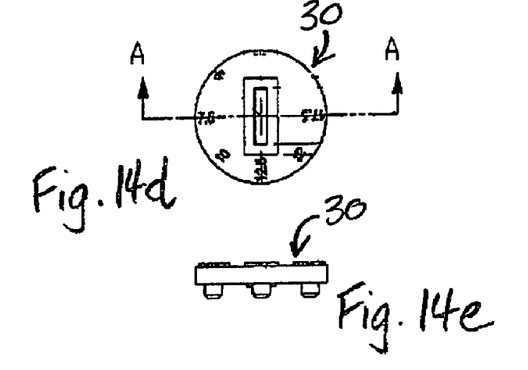
Figure 14F:
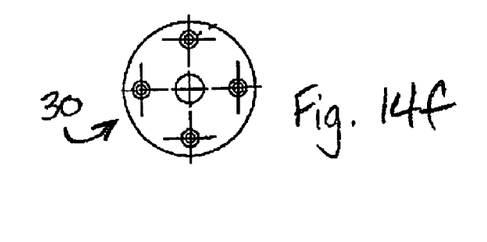

With referenced to FIGS. 3 and 6-14, the dial switch mechanism 28 includes a dial shaft 40, a dial cover 30, a dial detent 36, a detent spring 38, a rotating contact 42 or central contacting member, a 10.0 μF cam contact 62, a 5.0 μF cam contact 64, and a 2.5 μF cam contact 66. As best shown in FIG. 7, the 10.0 μF lead wire 52 is connected to a 10.0 μF terminal 53. Likewise, the 5.0 μF lead wire 54 is connected to a 5.0 μF terminal 55, the 2.5 μF lead wire 56 is connected to a 2.5 μF terminal 57, and the common lead wire 50 is connected to a common terminal 51. The terminals 51, 53, 55, and 57 are mounted on insulating mounting strip 60. The terminals 53, 55, and 57 are connected to the 10.0 μF cam contact 62, the 5.0 μF cam contact 64, and the 2.5 μF cam contact 66, respectively.

Figure 3:
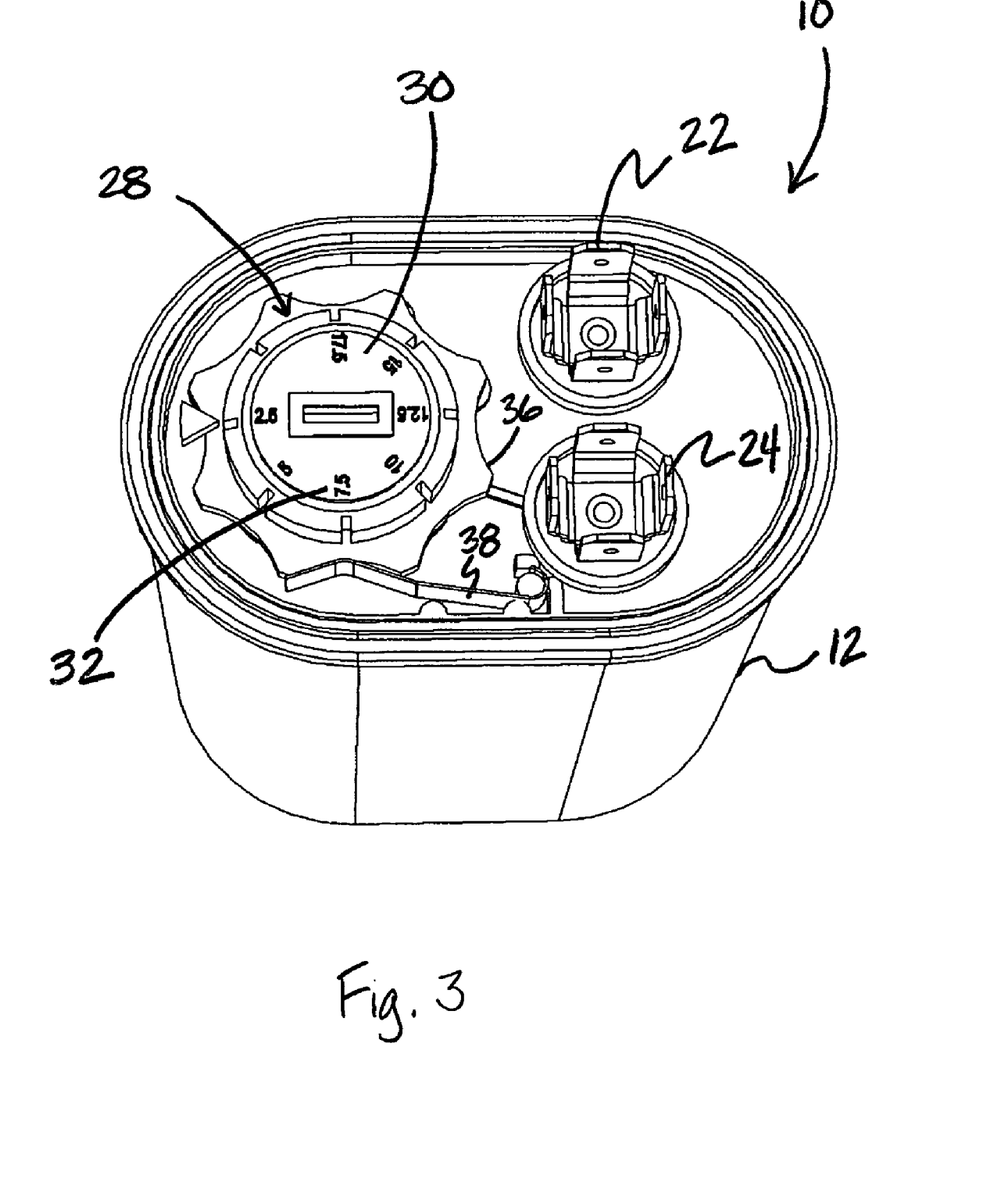
FIG. 3 is a perspective view of the multi value capacitor in accordance with the present invention with the top cover of the can removed.
Figure 4:
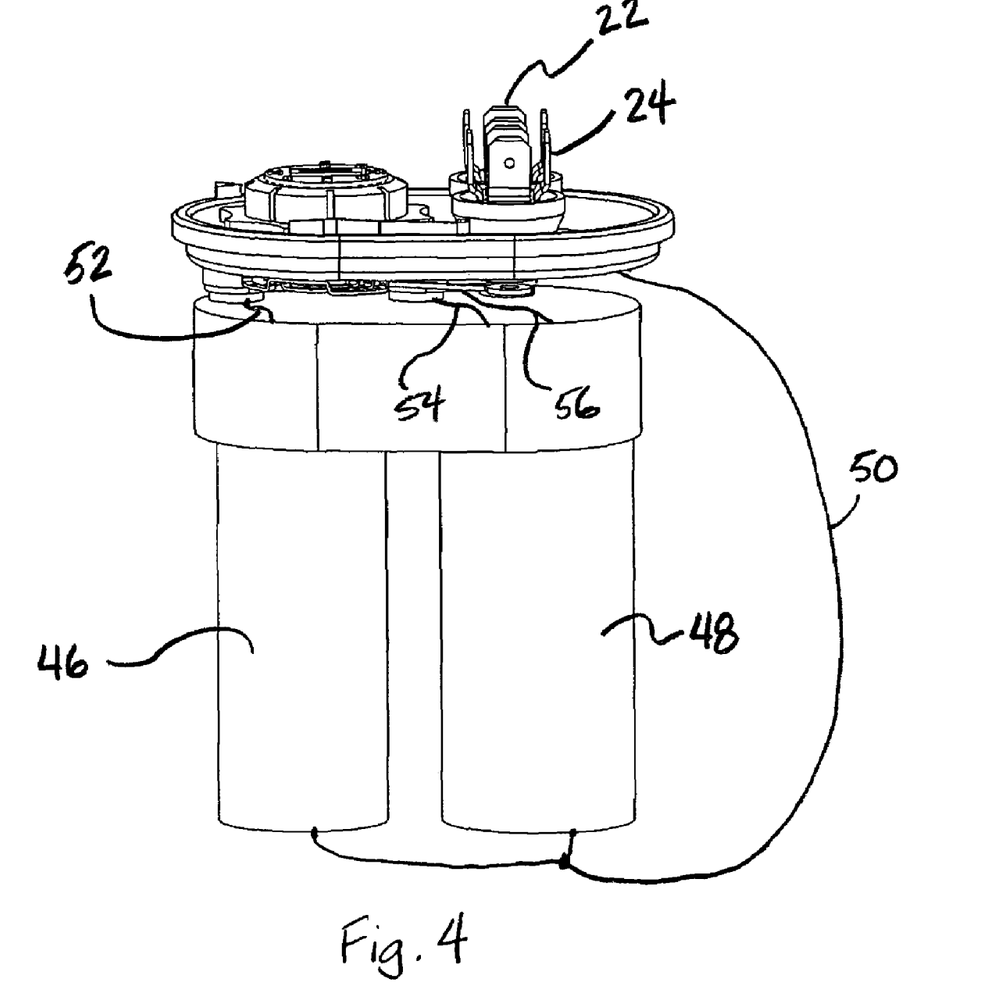
FIG. 4 is a front perspective view (with schematic elements) of the multi value capacitor in accordance with the present invention.
Figure 5A:
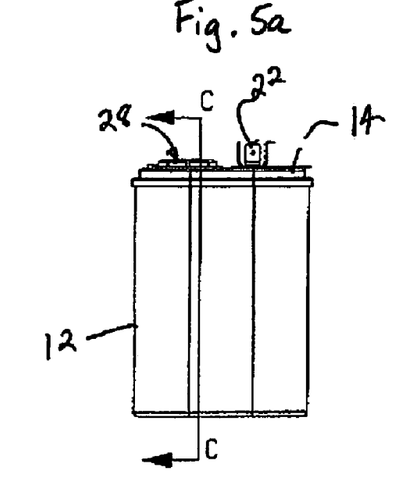
FIGS. 5a-5f are assembly drawings of the multi value capacitor in accordance with the present invention.
Figure 5B:
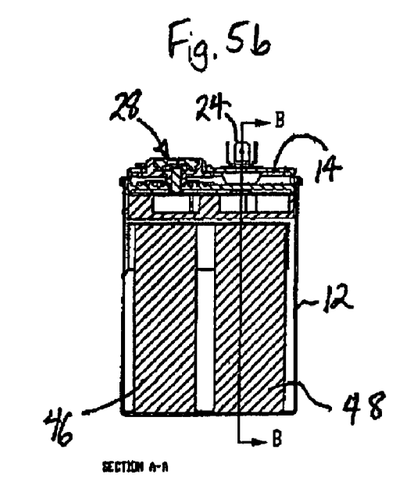
Figure 5C:
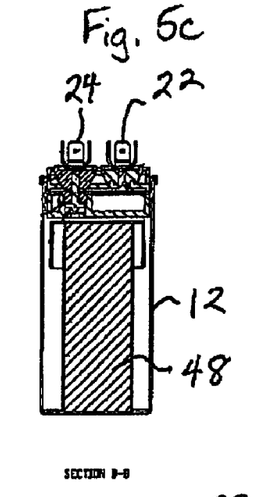
Figure 5D:
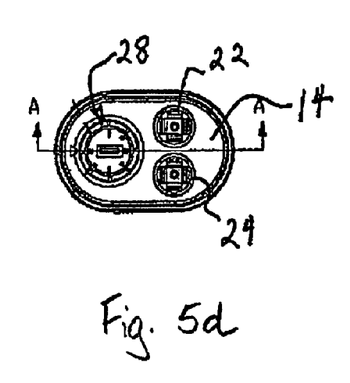
Figure 5E:
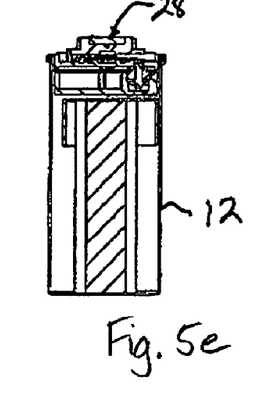
Figure 5F:
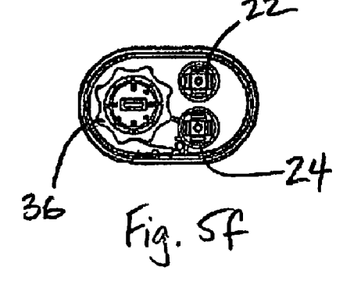

In FIG. 3, the top cover 14 has been removed from the can 12 in order to expose the dial detent 36 connected to one end of the dial shaft 40. The dial cover 30 is mounted on the dial detent 36 so that manual rotation of the of dial cover 30, rotates the dial detent 36 and the dial shaft 40. The rotating contact 42 is connected to the dial shaft 40 and rotates with the dial shaft 40 as the dial detent 36 is manually turned by means of the dial cover 30. The detent spring 38 restrains the rotation of the dial shaft 40 in one of eight rotational positions. FIGS. 6 and 7 illustrate the detail of the dial switch mechanism 28, particularly the relationship between the rotating contact 42 and the cam contacts 62, 64, and 66.

The rotating contact 42 is illustrated in FIGS. 9a-9g. The 2.5 μF cam contact 66 is shown in FIGS. 10a-10e, the 5.0 μF cam contact 64 is shown in FIGS. 11a-11e, and the 10.0 μF cam contact 62 is shown in FIGS. 12a-12e. The rotating contact 42 (FIGS. 9a-9g) has three contacts, the outside wiper contact 43 which engages the 2.5 μF cam contact 66, the middle wiper contact 44 which engages the 5.0 μF cam contact 64, and the inside wiper contact 45 which engages the 10.0 μF cam contact 62. As shown in FIGS. 10a-10e, the 2.5 μF cam contact 66 has four raised portions 68-71 and four alternating depressed portions 73-76. As shown in FIGS. 11a-11e, the 5.0 μF cam contact 64 has two raised portions 78 and 79 and two alternating depressed portions 81 and 82. As shown in FIGS. 12a-12e, the 10.0 μF cam contact 62 has one raised portion 84 and one alternating depressed portion 85.

Returning to FIG. 6, rotation of the dial shaft 40 causes the rotating contact 42 with its three wiper contacts 43, 44, and 45 to engage the raised portions of the cam contacts 62, 64, and 66 in various combinations for each of the eight positions defined by the dial detent 36. For example, in the position shown in FIG. 6, the wiper contact 43 of the rotating contact 42 engages the raised portion 71 of the 2.5 μF cam contact 66. The other wiper contacts 44 and 45 of the rotating contact 42 are aligned with depressed portions of the 5.0 μF cam contact 64 and of the 10.0 μF cam contact 62. Therefore, only the 2.5 μF capacitor element is connected through the shaft 40 to the switched lead wire 58 and thereby to the output terminal 24. Thus the multi value capacitor 10 has a value of 2.5 μF when the dial switch mechanism 28 is in the position shown in FIG. 6.

When the dial shaft 40 rotates clockwise to the next position established by the dial detent 36, the rotating contact 42 disengages the 2.5 μF cam contact 66 and engages the 5.0 μF cam contact 64. Consequently the value of the capacitor 10 is 5.0 μF. When the dial shaft 40 rotates clockwise to the next position established by the dial detent 36, the rotating contact 42 engages the 2.5 μF cam contact 66 and also engages the 5.0 μF cam contact 64. Consequently the value of the capacitor 10 is 7.5 μF. When the dial shaft 40 rotates clockwise to the next position established by the dial detent 36, the rotating contact 42 disengages the 2.5 μF cam contact 66, disengages the 5.0 μF cam contact 64, and engages only the 10.0 μF cam contact 66. Consequently the value of the capacitor 10 is 10.0 μF. Each further rotation of the dial shaft 40 connects the capacitor elements 46, 48 in accordance with Table 1 above. In the last rotational position (one position counter-clockwise from the position shown in FIG. 6), the rotating contact 42 aligns with the depressed portions of each of the cam contacts 62, 64, and 66 and the capacitance value is 0 μF.

Figure 15:
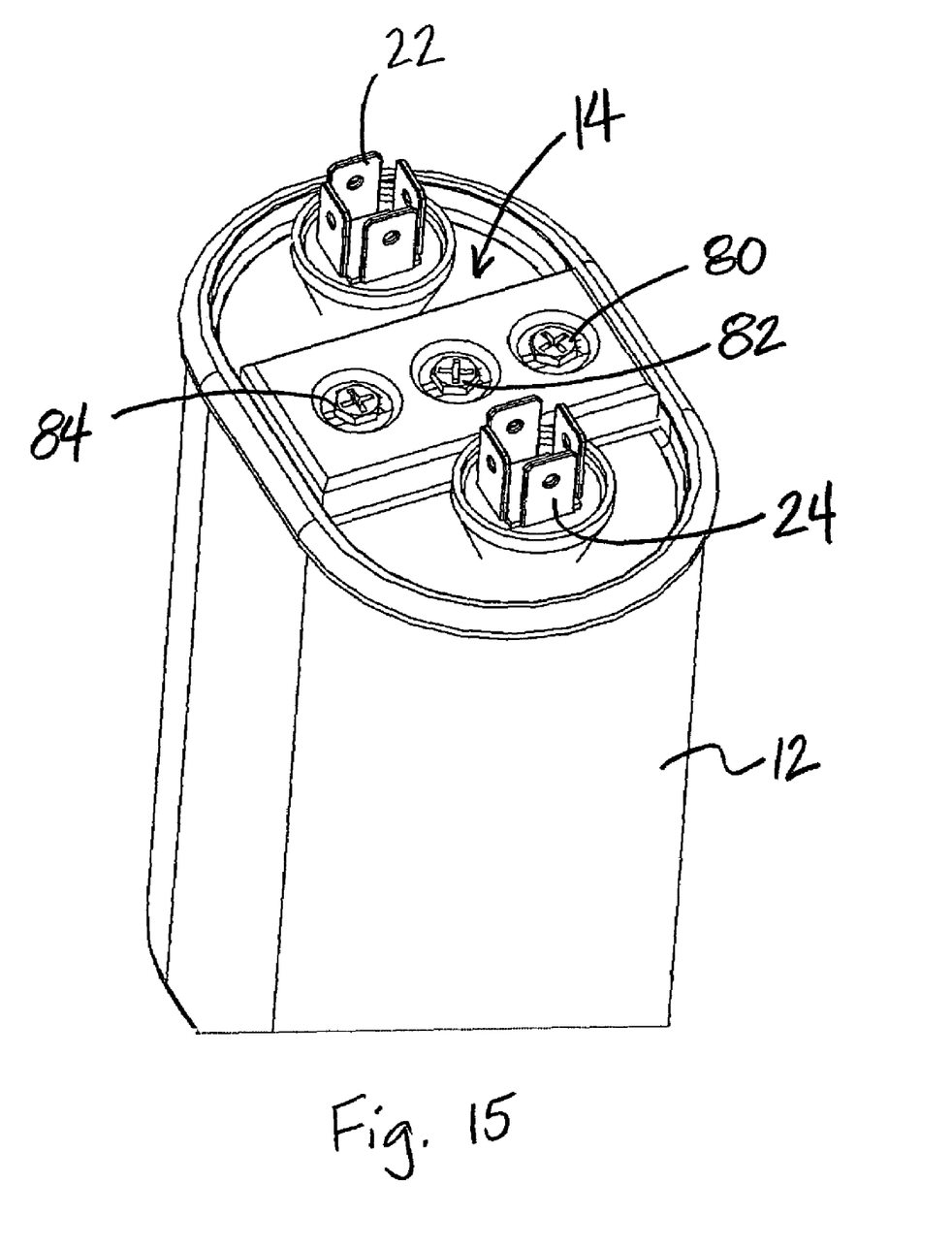
FIG. 15 is a perspective view of a second embodiment of the multi value capacitor in accordance with the present invention.

Another embodiment of the present invention is illustrated in FIG. 15, wherein the dial switch mechanism 28 is replaced with multiple screws 80, 82, 84 that are able to engage the central contacting member to connect the switched terminal 24 with the various capacitor elements 46, 48. That is, inserting or removing the screws 80, 82, 84 at the top of the can 12 accomplishes field programming. The screws 80, 82, 84 interconnect the capacitor elements 46, 48 in accordance with the values in Table 1 above.

While this invention has been described with reference to preferred embodiments thereof, it is to be understood that variations and modifications can be affected within the spirit and scope of the invention as described herein and as described in the appended claims.

What is claimed is:

1. A multi value capacitor comprising:
   a can having a top cover;
   a common terminal mounted on said top cover;
   a switched terminal mounted on said top cover;
   a first capacitor element housed in said can and connected to said common terminal;
   a second capacitor element housed in said can and connected to said common terminal;
   a third capacitor element housed in said can and connected to said common terminal; and
   a dial switch mechanism mounted on said top cover, said dial switch mechanism including a rotating contact for selectively connecting with said first capacitor element, said second capacitor element, and said third capacitor element to generate a predetermined capacitance.

2. The multiple value capacitor as described in claim 1, said dial switch mechanism including:
   a dial cover mounted on the top cover;
   a dial shaft connected with said dial cover;
   a dial detent connected with said dial shaft; and
   a detent spring engaging said dial detent to restrain the rotation of said dial shaft to one of a predetermined number of positions.

3. The multiple value capacitor as described in claim 2, wherein said dial cover a dial cover includes indices printed thereon; and wherein said dial switch mechanism further comprises a pointer mounted on the top cover directed toward said indices on said dial cover corresponding with the capacitance value of said capacitor.

4. The multiple value capacitor as described in claim 1, wherein said first capacitor element has a first capacitance value.

5. The multiple value capacitor as described in claim 1 further comprising a first cam contact having four raised portions and four alternating depressed portions.

6. The multiple value capacitor as described in claim 5 wherein said rotating contact includes a first inner wiper contact to engage said raised portions of said first cam contact.

7. The multiple value capacitor as described in claim 4, wherein said second capacitor element has a second capacitance value twice the value of said first capacitance value.

8. The multiple value capacitor as described in claim 1 further comprising a second cam contact having two raised portions and two alternating depressed portions.

9. The multiple value capacitor as described in claim 8 wherein said rotating contact includes a second wiper contact to engage said raised portions of said second cam contact.

10. The multiple value capacitor as described in claim 7, wherein said third capacitor element has a third capacitance value twice the value of said second capacitance value.

11. The multiple value capacitor as described in claim 1 further comprising a third cam contact having one raised portion and one depressed portion.

12. The multiple value capacitor as described in claim 11, further wherein said rotating contact includes a third wiper contact to engage said raised portion of said second cam contact.

13. A multiple value capacitor comprising:
    a housing;
    a plurality of capacitor elements enclosed within said housing;
    a common terminal mounted to said housing and connected to each of said plurality of capacitor elements;
    a switched terminal mounted to said housing;
    a dial switch mechanism connected with said switched terminal, said dial switch mechanism including a movable contact in selective connection with said capacitor elements to create multiple capacitance values.

14. The multiple value capacitor as described in claim 13, wherein said plurality of capacitor elements comprises:
    a first capacitor element stored in said housing and connected to said common terminal;
    a second capacitor element housed in said can and connected to said common terminal; and
    a third capacitor element housed in said can and connected to said common terminal.

15. The multiple value capacitor as described in claim 14, wherein said first capacitor element has a first capacitance, said second capacitor element has a second capacitance that is twice the value of said first capacitance, and said third capacitor element has a third capacitance that is twice the value of said second capacitance.

16. The multiple value capacitor as described in claim 14, wherein said dial switch mechanism further comprises:
    a first cam contact connected with said first capacitor element;
    a second cam contact connected with said second capacitor element; and
    a third cam contact connected with said third capacitor element.

17. The multiple value capacitor as described in claim 16, wherein said moveable contact engages said first cam contact, said second cam contact, and said third cam contact, separately and in combination, to create various capacitance values.

18. The multiple value capacitor as described in claim 13, wherein said dial switch mechanism includes:
    a dial shaft connected to said moveable contact;
    a dial detent connected to said dial shaft; and
    a detent spring connected to said housing and engaging said dial detent to control the movement of said dial detent and said dial shaft.

19. A method for generating multiple capacitance values in a single housing for a multi value capacitor comprising the steps of:
    a. providing multiple capacitor elements in the housing, each of said capacitor elements connected to a common terminal mounted to the housing;
    b. providing a switching mechanism connected to a switched terminal mounted to the housing, said switching mechanism including a central contacting member;
    c. selectively engaging said capacitor elements with said central contacting member; and
    d. creating multiple capacitance values according to said capacitor elements contacted by said central contacting member.

20. The method as described in claim 19, wherein after step b, further comprising the step of providing multiple cam contacts in the housing, each cam contact independently connected with one of said capacitor elements.

* * * * *